United States Patent
Taherzadeh Boroujeni et al.

(10) Patent No.: US 11,705,949 B2
(45) Date of Patent: Jul. 18, 2023

(54) TECHNIQUES FOR CHANNEL STATE INFORMATION REPORT TRANSMISSION TRIGGERED BY NEGATIVE ACKNOWLEDGMENT (NACK)

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 17/224,712

(22) Filed: Apr. 7, 2021

(65) Prior Publication Data
US 2021/0336674 A1    Oct. 28, 2021

Related U.S. Application Data

(60) Provisional application No. 63/015,218, filed on Apr. 24, 2020.

(51) Int. Cl.
*H04B 7/06* (2006.01)
*H04L 1/1867* (2023.01)
(Continued)

(52) U.S. Cl.
CPC ......... *H04B 7/0626* (2013.01); *H04L 1/1896* (2013.01); *H04W 72/21* (2023.01); *H04W 72/23* (2023.01)

(58) Field of Classification Search
CPC ... H04B 7/0626; H04L 1/0026; H04L 1/0027; H04L 1/08; H04L 1/1671; H04L 1/1896;
(Continued)

(56) References Cited

U.S. PATENT DOCUMENTS

2008/0102898 A1*   5/2008   Na .................. H04B 7/0634
                                                    455/562.1
2009/0247200 A1*  10/2009   Hwang ............ H04B 7/0617
                                                    455/507
(Continued)

FOREIGN PATENT DOCUMENTS

WO    WO-2020070728 A1    4/2020

OTHER PUBLICATIONS

ETRI: "Discussion on L1 Enhancements for URLLC", 3GPP Draft, 3GPP TSG RAN WG1 Meeting #94bis, R1-1810949 Discussion on L1 Enhancements for URLLC—Final, 3rd Generation Partnership Project (3GPP), Mobile Competence Centre, 650, Route Des Lucioles, F-06921 Sophia-Antipolis Cedex, vol. RAN WG1, No. Chengdu, China, Oct. 8, 2018-Oct. 12, 2018 Sep. 28, 2018 (Sep. 28, 2018), XP051518354, pp. 1-4, Retrieved from the Internet: URL: http://www.3gpp.org/ftp/tsg%5Fran/WG1%5FRL1/TSGR1%5F94b/Docs/R1%2D1810949%2Ezip[retrieved on Sep. 28, 2018] Section 3.

(Continued)

*Primary Examiner* — Dung B Huynh
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may transmit a negative acknowledgment (NACK) associated with a downlink communication, and may transmit a channel state information (CSI) report based at least in part on transmitting the NACK associated with the downlink communication. In some aspects, a base station may receive, from a UE, a NACK associated with a downlink communication, and may monitor for the CSI report based at least in part on receiving the NACK. Numerous other aspects are provided.

26 Claims, 7 Drawing Sheets

(51) Int. Cl.
*H04W 72/21* (2023.01)
*H04W 72/23* (2023.01)

(58) Field of Classification Search
CPC . H04L 5/0048; H04L 5/0055; H04W 72/1284
See application file for complete search history.

(56) References Cited

U.S. PATENT DOCUMENTS

| | | | | |
|---|---|---|---|---|
| 2012/0307755 A1* | 12/2012 | Kim | H04L 1/1825 | 370/329 |
| 2013/0223301 A1* | 8/2013 | Lee | H04W 72/0413 | 370/329 |
| 2014/0204856 A1* | 7/2014 | Chen | H04L 5/0057 | 370/329 |
| 2014/0301231 A1* | 10/2014 | Hooli | H04W 24/08 | 370/252 |
| 2014/0314034 A1* | 10/2014 | Yang | H04L 1/003 | 370/329 |
| 2015/0071193 A1* | 3/2015 | Seo | H04L 1/1692 | 370/329 |
| 2015/0256246 A1* | 9/2015 | Ishihara | H04B 7/0456 | 375/267 |
| 2015/0326354 A1* | 11/2015 | Li | H04L 1/1864 | 370/329 |
| 2016/0119762 A1* | 4/2016 | Zhu | H04B 7/0456 | 370/312 |
| 2016/0226649 A1* | 8/2016 | Papasakellariou | H04W 4/70 | |
| 2017/0331602 A1* | 11/2017 | Hugl | H04L 5/0048 | |
| 2017/0338877 A1* | 11/2017 | Yum | H04B 7/0626 | |
| 2017/0347276 A1* | 11/2017 | Yu | H04L 5/0053 | |
| 2018/0091265 A1* | 3/2018 | Liu | H04L 1/08 | |
| 2018/0091280 A1* | 3/2018 | Kim | H04L 1/1671 | |
| 2018/0220458 A1* | 8/2018 | Ouchi | H04L 27/2601 | |
| 2018/0323940 A1* | 11/2018 | Rico Alvarino | H04L 5/0057 | |
| 2019/0097779 A1* | 3/2019 | Wu | H04L 1/1858 | |
| 2019/0104517 A1* | 4/2019 | Park | H04W 72/0413 | |
| 2019/0261354 A1 | 8/2019 | Fakoorian et al. | | |
| 2019/0288804 A1* | 9/2019 | Jiang | H04L 5/0082 | |
| 2019/0306922 A1* | 10/2019 | Xiong | H04L 1/1664 | |
| 2019/0312614 A1* | 10/2019 | Kim | H04W 72/14 | |
| 2019/0313436 A1* | 10/2019 | Lee | H04L 5/0094 | |
| 2019/0349121 A1 | 11/2019 | Tian et al. | | |
| 2020/0028652 A1* | 1/2020 | Bai | H04B 7/088 | |
| 2020/0041604 A1* | 2/2020 | Kim | G01S 5/036 | |
| 2020/0077414 A1* | 3/2020 | Ye | H04L 1/0013 | |
| 2020/0112419 A1* | 4/2020 | Bagheri | H04L 5/0048 | |
| 2020/0127781 A1* | 4/2020 | Yerramalli | H04B 7/0482 | |
| 2020/0163059 A1* | 5/2020 | Zhang | H04B 7/0408 | |
| 2020/0204329 A1* | 6/2020 | Fujishiro | H04W 56/0045 | |
| 2020/0214006 A1* | 7/2020 | Choi | H04W 74/0833 | |
| 2020/0214031 A1* | 7/2020 | Chen | H04W 72/1284 | |
| 2020/0260432 A1* | 8/2020 | Islam | H04W 72/0413 | |
| 2020/0367244 A1* | 11/2020 | Yang | H04L 1/0026 | |
| 2020/0374911 A1* | 11/2020 | Lee | H04W 72/1289 | |
| 2020/0383119 A1* | 12/2020 | Sun | G16Y 10/75 | |
| 2020/0389766 A1* | 12/2020 | Kim | H04L 5/0048 | |
| 2021/0014017 A1* | 1/2021 | Zhou | H04L 5/0007 | |
| 2021/0028852 A1* | 1/2021 | Hwang | H04B 17/327 | |
| 2021/0036822 A1* | 2/2021 | Lyu | H04L 5/0048 | |
| 2021/0050897 A1* | 2/2021 | Huang | H04L 5/0055 | |
| 2021/0058967 A1* | 2/2021 | Oteri | H04W 72/042 | |
| 2021/0076395 A1* | 3/2021 | Zhou | H04B 7/022 | |
| 2021/0184742 A1* | 6/2021 | Gao | H04L 25/0226 | |
| 2021/0184819 A1* | 6/2021 | Takeda | H04L 5/0057 | |
| 2021/0211957 A1* | 7/2021 | Kamohara | H04B 7/0617 | |
| 2021/0227555 A1* | 7/2021 | Lin | H04L 5/0053 | |
| 2021/0235308 A1* | 7/2021 | Zhang | H04L 1/0026 | |
| 2021/0243761 A1* | 8/2021 | Yoshioka | H04B 7/0626 | |
| 2021/0258966 A1* | 8/2021 | Yoshioka | H04W 72/0413 | |
| 2021/0307025 A1* | 9/2021 | Hosseini | H04W 76/11 | |
| 2021/0314124 A1* | 10/2021 | Wu | H04L 5/0055 | |
| 2021/0320776 A1* | 10/2021 | Aiba | H04L 5/0057 | |
| 2021/0337415 A1* | 10/2021 | Chen | H04W 24/10 | |
| 2021/0345362 A1* | 11/2021 | Kim | H04L 5/0094 | |
| 2021/0360610 A1* | 11/2021 | Kim | H04W 72/042 | |
| 2021/0400677 A1* | 12/2021 | Lee | H04W 72/082 | |
| 2022/0038935 A1* | 2/2022 | Xiong | H04L 1/0072 | |
| 2022/0052798 A1* | 2/2022 | Li | H04L 1/1854 | |
| 2022/0078649 A1* | 3/2022 | Chen | H04L 25/0224 | |
| 2022/0086676 A1* | 3/2022 | Ai | H04W 72/04 | |
| 2022/0094505 A1* | 3/2022 | He | H04L 1/0027 | |
| 2022/0095265 A1* | 3/2022 | Cha | H04L 5/0051 | |
| 2022/0182118 A1* | 6/2022 | Pezeshki | H04B 7/0639 | |
| 2022/0182157 A1* | 6/2022 | Furuskär | H04B 17/345 | |
| 2022/0183079 A1* | 6/2022 | Ouchi | H04W 48/08 | |
| 2022/0201502 A1* | 6/2022 | Kang | H04B 7/0408 | |
| 2022/0256387 A1* | 8/2022 | Xiao | H04W 24/08 | |
| 2022/0360307 A1* | 11/2022 | Matsumura | H04L 1/0026 | |

OTHER PUBLICATIONS

International Search Report and Written Opinion—PCT/US2021/026452—ISA/EPO—dated Jun. 23, 2021.

\* cited by examiner

TECHNIQUES FOR CHANNEL STATE INFORMATION REPORT TRANSMISSION TRIGGERED BY NEGATIVE ACKNOWLEDGMENT (NACK)

CROSS-REFERENCE TO RELATED APPLICATION

This patent application claims priority to U.S. Provisional Patent Application No. 63/015,218, filed on Apr. 24, 2020, entitled "TECHNIQUES FOR CHANNEL STATE INFORMATION REPORT TRANSMISSION TRIGGERED BY NEGATIVE ACKNOWLEDGMENT (NACK)," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for channel state information (CSI) report transmission triggered by a negative acknowledgment (NACK).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a UE, may include transmitting a NACK associated with a downlink communication; and transmitting a CSI report based at least in part on transmitting the NACK associated with the downlink communication.

In some aspects, the CSI report is a coverage enhanced CSI report.

In some aspects, transmitting the CSI report includes performing CSI report repetition.

In some aspects, the NACK indicates that the downlink communication was not received by the UE.

In some aspects, the NACK indicates that the downlink communication was received by the UE and that a channel quality associated with receiving the downlink communication failed to satisfy a threshold.

In some aspects, the CSI report is transmitted based at least in part on a configured grant associated with a physical uplink shared channel.

In some aspects, information indicating a setting of a reporting parameter associated with the CSI report is received in a CSI reporting configuration.

In some aspects, information indicating a setting of a reporting parameter associated with the CSI report is received in downlink control information associated with triggering a semi-persistent CSI report.

In some aspects, the CSI report is transmitted based at least in part on a reporting parameter associated with at least one of a period of time during which the CSI report is to be transmitted, a number of CSI report repetitions associated with transmitting the CSI report, or a configured grant associated with the CSI report.

In some aspects, the NACK is transmitted using PUCCH format 0 or PUCCH format 1.

In some aspects, the CSI report is transmitted based at least in part on a CSI reporting configuration.

In some aspects, a CSI reporting configuration associated with the CSI report is received via radio resource control signaling.

In some aspects, a method of wireless communication, performed by a base station, may include receiving, from a UE, a NACK associated with a downlink communication; determining, based at least in part on receiving the NACK, that the UE is to transmit a CSI report; and monitoring for the CSI report based at least in part on determining that the UE is to transmit the CSI report.

In some aspects, a method of wireless communication, performed by a base station, may include receiving, from a UE, a NACK associated with a downlink communication; and monitoring for a CSI report based at least in part on receiving the NACK associated with the downlink communication.

In some aspects, the CSI report is a coverage enhanced CSI report.

In some aspects, the CSI report is to be transmitted using CSI report repetition.

In some aspects, the NACK indicates that the downlink communication was not received by the UE.

In some aspects, the NACK indicates that the downlink communication was received by the UE and that a channel quality associated with receiving the downlink communication failed to satisfy a threshold.

In some aspects, monitoring for the CSI report is performed based at least in part on a configured grant associated with a physical uplink shared channel.

In some aspects, information indicating a setting of a reporting parameter associated with the CSI report is transmitted in a CSI reporting configuration.

In some aspects, information indicating a setting of a reporting parameter associated with the CSI report is transmitted in downlink control information associated with triggering a semi-persistent CSI report.

In some aspects, monitoring for the CSI report is performed based at least in part on a reporting parameter indicating at least one of a period of time during which the CSI report is to be transmitted, a number of CSI report repetitions associated with transmitting the CSI report, or a configured grant associated with the CSI report.

In some aspects, the NACK uses PUCCH format 0 or PUCCH format 1.

In some aspects, a physical uplink control channel format of the NACK is determined based at least in part on performing blind format detection.

In some aspects, a CSI reporting configuration associated with the CSI report is transmitted via radio resource control signaling.

In some aspects, a UE for wireless communication may include a memory and one or more processors coupled to the memory. The memory and the one or more processors may be configured to transmit a NACK associated with a downlink communication; and transmit a CSI report based at least in part on transmitting the NACK associated with the downlink communication.

In some aspects, the CSI report is a coverage enhanced CSI report.

In some aspects, transmitting the CSI report includes performing CSI report repetition.

In some aspects, the NACK indicates that the downlink communication was not received by the UE.

In some aspects, the NACK indicates that the downlink communication was received by the UE and that a channel quality associated with receiving the downlink communication failed to satisfy a threshold.

In some aspects, the CSI report is transmitted based at least in part on a configured grant associated with a physical uplink shared channel.

In some aspects, information indicating a setting of a reporting parameter associated with the CSI report is received in a CSI reporting configuration.

In some aspects, information indicating a setting of a reporting parameter associated with the CSI report is received in downlink control information associated with triggering a semi-persistent CSI report.

In some aspects, the CSI report is transmitted based at least in part on a reporting parameter associated with at least one of a period of time during which the CSI report is to be transmitted, a number of CSI report repetitions associated with transmitting the CSI report, or a configured grant associated with the CSI report.

In some aspects, the NACK is transmitted using PUCCH format 0 or PUCCH format 1.

In some aspects, the CSI report is transmitted based at least in part on a CSI reporting configuration.

In some aspects, a CSI reporting configuration associated with the CSI report is received via radio resource control signaling.

In some aspects, a base station for wireless communication may include a memory and one or more processors coupled to the memory. The memory and the one or more processors may be configured to receive, from a UE, a NACK associated with a downlink communication; determine, based at least in part on receiving the NACK, that the UE is to transmit a CSI report; and monitor for the CSI report based at least in part on determining that the UE is to transmit the CSI report.

In some aspects, a base station for wireless communication may include a memory and one or more processors coupled to the memory. The memory and the one or more processors may be configured to receive, from a UE, a NACK associated with a downlink communication; and monitor for a CSI report based at least in part on receiving the NACK associated with the downlink communication.

In some aspects, the CSI report is a coverage enhanced CSI report.

In some aspects, the CSI report is to be transmitted using CSI report repetition.

In some aspects, the NACK indicates that the downlink communication was not received by the UE.

In some aspects, the NACK indicates that the downlink communication was received by the UE and that a channel quality associated with receiving the downlink communication failed to satisfy a threshold.

In some aspects, monitoring for the CSI report is performed based at least in part on a configured grant associated with a physical uplink shared channel.

In some aspects, information indicating a setting of a reporting parameter associated with the CSI report is transmitted in a CSI reporting configuration.

In some aspects, information indicating a setting of a reporting parameter associated with the CSI report is transmitted in downlink control information associated with triggering a semi-persistent CSI report.

In some aspects, monitoring for the CSI report is performed based at least in part on a reporting parameter indicating at least one of a period of time during which the CSI report is to be transmitted, a number of CSI report repetitions associated with transmitting the CSI report, or a configured grant associated with the CSI report.

In some aspects, the NACK uses PUCCH format 0 or PUCCH format 1.

In some aspects, a physical uplink control channel format of the NACK is determined based at least in part on performing blind format detection.

In some aspects, a CSI reporting configuration associated with the CSI report is transmitted via radio resource control signaling.

In some aspects, a non-transitory computer-readable medium may store one or more instructions for wireless communication. The one or more instructions, when executed by one or more processors of a UE, may cause the one or more processors to transmit a NACK associated with a downlink communication; and transmit a CSI report based at least in part on transmitting the NACK associated with the downlink communication.

In some aspects, the CSI report is a coverage enhanced CSI report.

In some aspects, transmitting the CSI report includes performing CSI report repetition.

In some aspects, the NACK indicates that the downlink communication was not received by the UE.

In some aspects, the NACK indicates that the downlink communication was received by the UE and that a channel quality associated with receiving the downlink communication failed to satisfy a threshold.

In some aspects, the CSI report is transmitted based at least in part on a configured grant associated with a physical uplink shared channel.

In some aspects, information indicating a setting of a reporting parameter associated with the CSI report is received in a CSI reporting configuration.

In some aspects, information indicating a setting of a reporting parameter associated with the CSI report is received in downlink control information associated with triggering a semi-persistent CSI report.

In some aspects, the CSI report is transmitted based at least in part on a reporting parameter associated with at least one of a period of time during which the CSI report is to be transmitted, a number of CSI report repetitions associated with transmitting the CSI report, or a configured grant associated with the CSI report.

In some aspects, the NACK is transmitted using PUCCH format 0 or PUCCH format 1.

In some aspects, the CSI report is transmitted based at least in part on a CSI reporting configuration.

In some aspects, a CSI reporting configuration associated with the CSI report is received via radio resource control signaling.

In some aspects, a non-transitory computer-readable medium may store one or more instructions for wireless communication. The one or more instructions, when executed by one or more processors of a base station, may cause the one or more processors to receive, from a UE, a NACK associated with a downlink communication; determine, based at least in part on receiving the NACK, that the UE is to transmit a CSI report; and monitor for the CSI report based at least in part on determining that the UE is to transmit the CSI report.

In some aspects, a non-transitory computer-readable medium may store one or more instructions for wireless communication. The one or more instructions, when executed by one or more processors of a base station, may cause the one or more processors to receive, from a UE, a NACK associated with a downlink communication; and monitor for a CSI report based at least in part on receiving the NACK associated with the downlink communication.

In some aspects, the CSI report is a coverage enhanced CSI report.

In some aspects, the CSI report is to be transmitted using CSI report repetition.

In some aspects, the NACK indicates that the downlink communication was not received by the UE.

In some aspects, the NACK indicates that the downlink communication was received by the UE and that a channel quality associated with receiving the downlink communication failed to satisfy a threshold.

In some aspects, monitoring for the CSI report is performed based at least in part on a configured grant associated with a physical uplink shared channel.

In some aspects, information indicating a setting of a reporting parameter associated with the CSI report is transmitted in a CSI reporting configuration.

In some aspects, information indicating a setting of a reporting parameter associated with the CSI report is transmitted in downlink control information associated with triggering a semi-persistent CSI report.

In some aspects, monitoring for the CSI report is performed based at least in part on a reporting parameter indicating at least one of a period of time during which the CSI report is to be transmitted, a number of CSI report repetitions associated with transmitting the CSI report, or a configured grant associated with the CSI report.

In some aspects, the NACK uses PUCCH format 0 or PUCCH format 1.

In some aspects, a physical uplink control channel format of the NACK is determined based at least in part on performing blind format detection.

In some aspects, a CSI reporting configuration associated with the CSI report is transmitted via radio resource control signaling.

In some aspects, an apparatus for wireless communication may include means for transmitting a NACK associated with a downlink communication; and means for transmitting a CSI report based at least in part on transmitting the NACK associated with the downlink communication.

In some aspects, the CSI report is a coverage enhanced CSI report.

In some aspects, transmitting the CSI report includes performing CSI report repetition.

In some aspects, the NACK indicates that the downlink communication was not received by the UE.

In some aspects, the NACK indicates that the downlink communication was received by the UE and that a channel quality associated with receiving the downlink communication failed to satisfy a threshold.

In some aspects, the CSI report is transmitted based at least in part on a configured grant associated with a physical uplink shared channel.

In some aspects, information indicating a setting of a reporting parameter associated with the CSI report is received in a CSI reporting configuration.

In some aspects, information indicating a setting of a reporting parameter associated with the CSI report is received in downlink control information associated with triggering a semi-persistent CSI report.

In some aspects, the CSI report is transmitted based at least in part on a reporting parameter associated with at least one of a period of time during which the CSI report is to be transmitted, a number of CSI report repetitions associated with transmitting the CSI report, or a configured grant associated with the CSI report.

In some aspects, the NACK is transmitted using PUCCH format 0 or PUCCH format 1.

In some aspects, the CSI report is transmitted based at least in part on a CSI reporting configuration.

In some aspects, a CSI reporting configuration associated with the CSI report is received via radio resource control signaling.

In some aspects, an apparatus for wireless communication may include means for receiving, from a UE, a NACK associated with a downlink communication; means for determining, based at least in part on receiving the NACK, that the UE is to transmit a CSI report; and means for monitoring for the CSI report based at least in part on determining that the UE is to transmit the CSI report.

In some aspects, an apparatus for wireless communication may include means for receiving, from a UE, a NACK associated with a downlink communication; and means for monitoring for a CSI report based at least in part on based at least in part on receiving the NACK associated with the downlink communication.

In some aspects, the CSI report is a coverage enhanced CSI report.

In some aspects, the CSI report is to be transmitted using CSI report repetition.

In some aspects, the NACK indicates that the downlink communication was not received by the UE.

In some aspects, the NACK indicates that the downlink communication was received by the UE and that a channel quality associated with receiving the downlink communication failed to satisfy a threshold.

In some aspects, monitoring for the CSI report is performed based at least in part on a configured grant associated with a physical uplink shared channel.

In some aspects, information indicating a setting of a reporting parameter associated with the CSI report is transmitted in a CSI reporting configuration.

In some aspects, information indicating a setting of a reporting parameter associated with the CSI report is transmitted in downlink control information associated with triggering a semi-persistent CSI report.

In some aspects, monitoring for the CSI report is performed based at least in part on a reporting parameter indicating at least one of a period of time during which the CSI report is to be transmitted, a number of CSI report repetitions associated with transmitting the CSI report, or a configured grant associated with the CSI report.

In some aspects, the NACK uses PUCCH format 0 or PUCCH format 1.

In some aspects, a physical uplink control channel format of the NACK is determined based at least in part on performing blind format detection.

In some aspects, a CSI reporting configuration associated with the CSI report is transmitted via radio resource control signaling.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
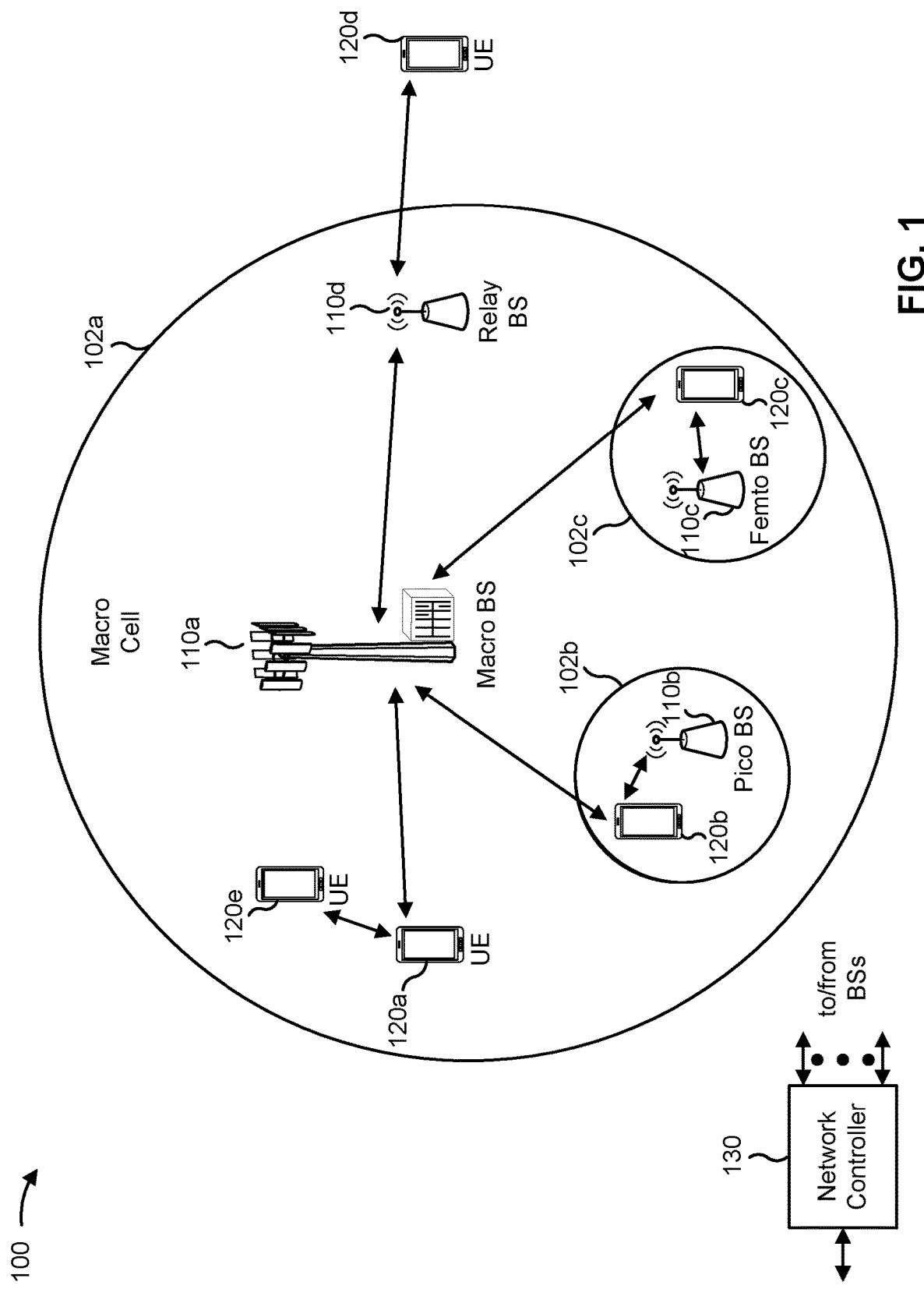
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "g B", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
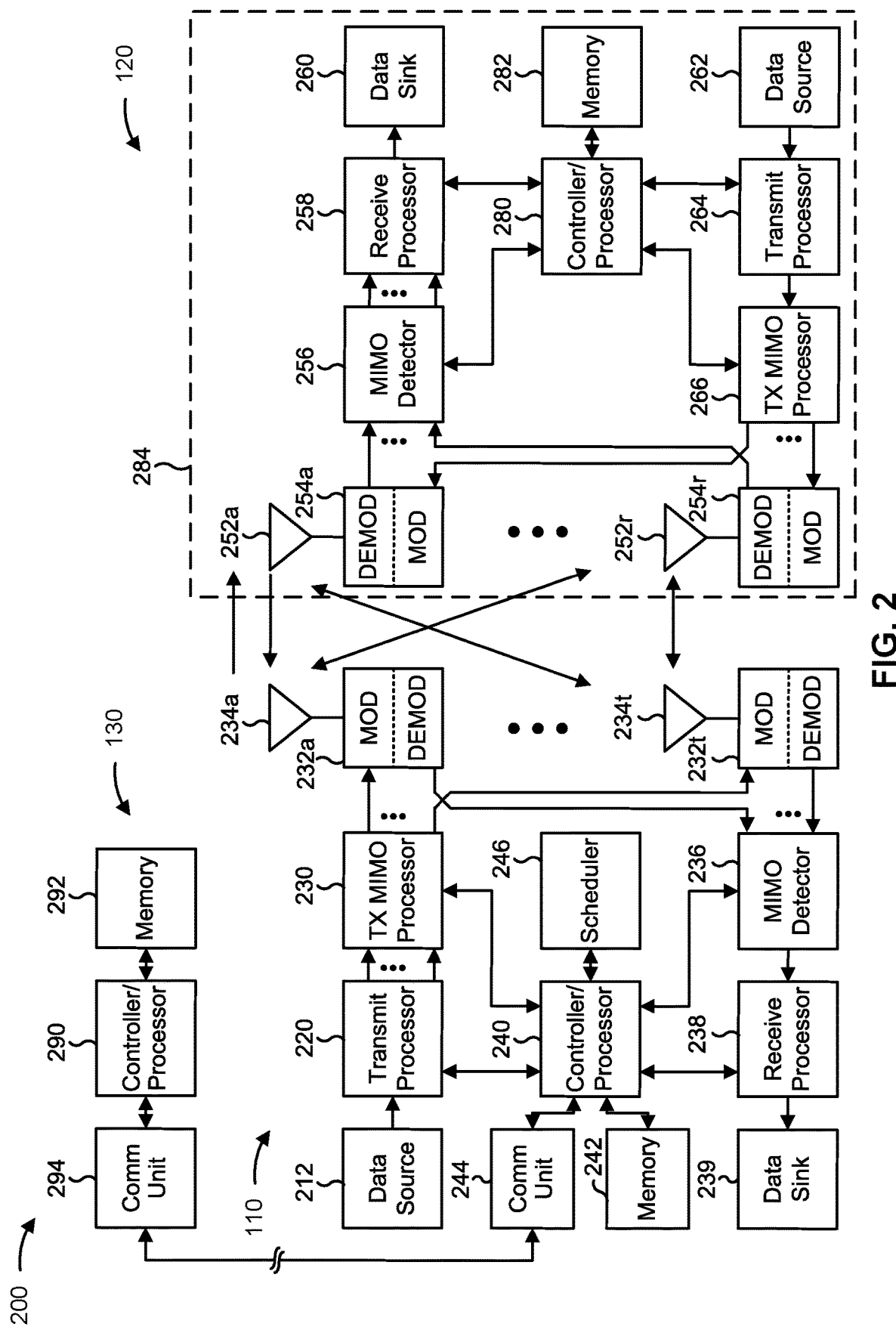
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with CSI report transmission triggered by a NACK, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, UE 120 may include means for transmitting a NACK associated with a downlink communication; means for transmitting a CSI report based at least in part on transmitting the NACK associated with the downlink communication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE 120, a NACK associated with a downlink communication; means for determining, based at least in part on receiving the NACK, that the UE 120 is to transmit a CSI report; means for monitoring for the CSI report based at least in part on determining that the UE 120 is to transmit the CSI report; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for receiving, from a UE 120, a NACK associated with a downlink communication; means for monitoring for a CSI report based at least in part on receiving the NACK associated with the downlink communication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In wireless communications, channel state information (CSI) refers to known channel properties of a communication link. Generally, CSI describes how a signal propagates from a transmitter to a receiver and represents the combined effect of, for example, scattering, fading, and power decay with distance.

In some wireless communication systems, such as an NR system, a UE (e.g., a UE 120) may be configured to report CSI to a base station (e.g., a base station 110). A CSI report provided by the UE may include information associated with, for example, a channel quality indicator (CQI), a precoding matrix indicator (PMI), a CSI reference signal resource indicator (CRI), a strongest layer indication (SLI), a rank indication (RI), a layer 1 (L1) reference signal received power (RSRP), an L1 signal-to-interference-plus-noise ratio (SINR), or the like.

In a wireless communication system, such as an NR system, there are three types of CSI reporting: periodic, semi-persistent, and aperiodic. A periodic CSI report can be carried on a short PUCCH or a long PUCCH. A semi-persistent CSI report can be carried on a long PUCCH or a physical uplink shared channel (PUSCH). Resources and/or a modulation and coding scheme (MCS) for a semi-persistent CSI reporting carried on a PUSCH can be allocated semi-persistently using downlink control information (DCI). Further, semi-persistent CSI reporting supports Type II with a minimum periodicity of 5 milliseconds (ms), and is not supported for aperiodic CSI reference signals. Periodic CSI reporting and semi-persistent CSI reporting support periodicities of 5 slots, 10 slots, 20 slots, 40 slots, 80 slots, 160 slots, and 320 slots. An aperiodic CSI report can be carried on a PUSCH multiplexed with or without uplink data.

In some wireless communication systems, such as an NR system, an L1-RSRP and/or an L1-SINR may be used for beam management. For example, an L1-SINR can be used for beam selection considering interference (e.g., with a similar format as L1-RSRP). In general, up to four beams can be reported per configured report. Here, an absolute SINR value can be reported for a first reported beam (e.g., a beam with a highest SINR), and differential SINR values are reported for each other beam, where a given differential SINR is computed with respect to the SINR associated with the first beam (e.g., the beam with the highest SINR).

Reliability of a CSI report, especially an L1-RSRP and an L1-SINR, is important for beam reliability to support, for example, unicast coverage in frequency range 2 (FR2) (e.g., since beam management may be needed on a more frequent basis for unicast communications in FR2). Notably, an L1-RSRP or an L1-SINR can be relatively large (e.g., approximately 20 bits), which may result in poor coverage of a physical uplink control channel (PUCCH) that carries a CSI report including such information.

Some aspects described herein provide techniques and apparatuses for CSI report transmission triggered by a negative acknowledgment (NACK). In some aspects, triggering a transmission of a CSI report by a NACK may improve coverage of the CSI report, thereby increasing reliability of beam management (e.g., for unicast channels in FR2) performed based at least in part on the CSI report. In some aspects, a UE (e.g., a UE 120) may transmit a NACK associated with a downlink communication, and may transmit a CSI report based at least in part on transmitting the NACK. In some aspects, the CSI report may be a coverage enhanced CSI report. For example, the UE may perform CSI report repetition when transmitting the CSI report, which improves coverage of the CSI report. In some aspects, a base station (e.g., a base station 110) may receive the NACK associated with the downlink communication, may determine that the UE is to transmit the CSI report based at least in part on receiving the NACK, and may monitor for the CSI report, accordingly. That is, in some aspects, the base station may receive the NACK associated with the downlink communication and may monitor for the CSI report based at least in part on receiving the NACK associated with the downlink communication. Additional details are provided below.

Figure 3:
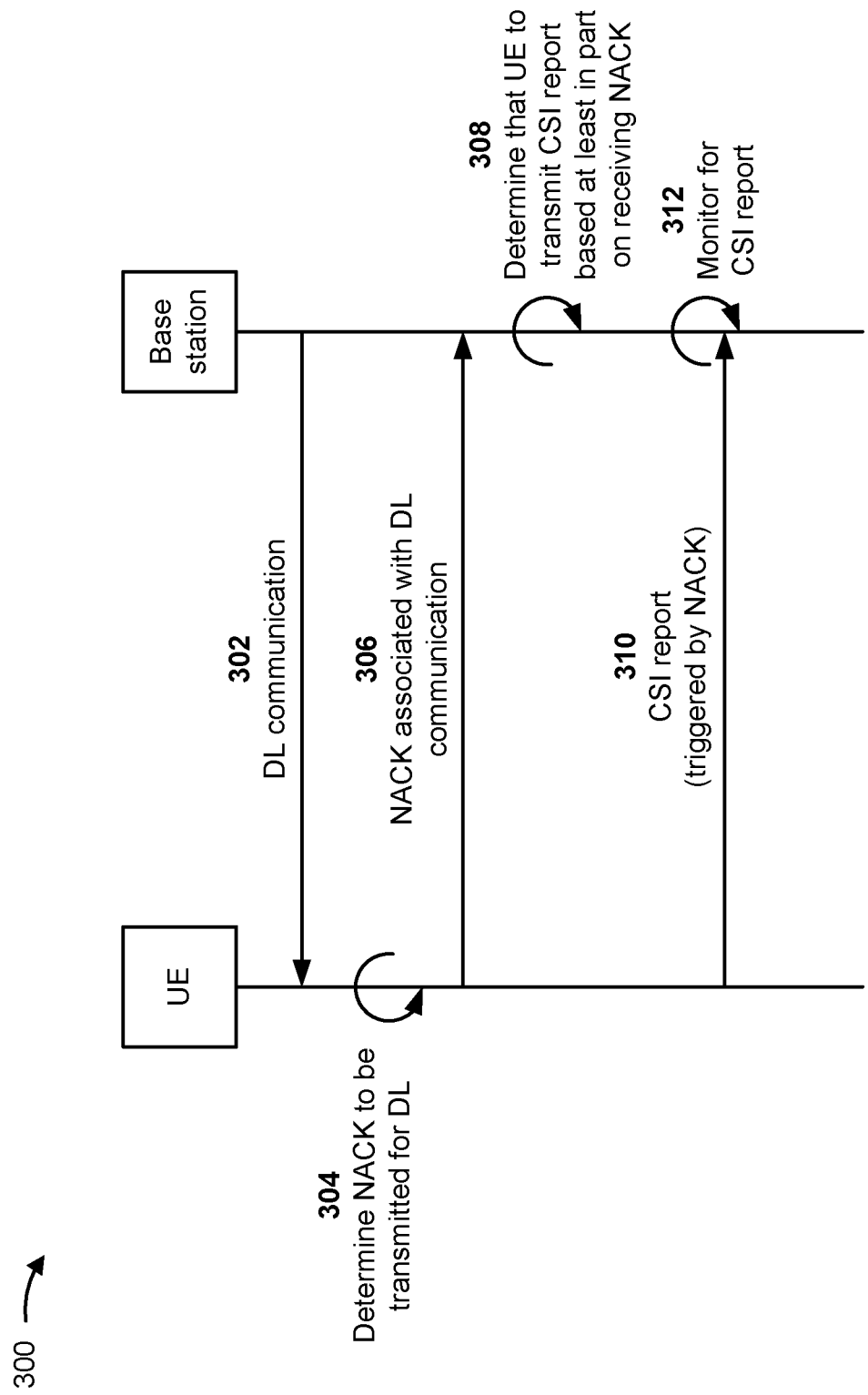
FIG. 3 is a diagram illustrating an example of a CSI report transmission triggered by a NACK, in accordance with the present disclosure.

FIG. 3 is a diagram illustrating an example 300 associated with CSI report transmission triggered by a NACK, in accordance with the present disclosure.

As shown by reference 302, a base station (e.g., a base station 110) may transmit a downlink communication to a UE (e.g., a UE 120). For example, the base station may transmit the downlink communication on a physical downlink shared channel (PDSCH) for receipt by the UE.

As shown by reference 304, the UE may determine that the UE is to transmit a NACK associated with the downlink communication. For example, the UE may fail to receive the downlink communication (e.g., the UE may fail to decode the downlink communication), and may determine that the UE is to transmit a NACK associated with the downlink communication based at least in part on failing to receive the downlink communication. As another example, the UE may receive the downlink communication (e.g., the UE may successfully decode the downlink communication), but may determine that a channel quality associated with receiving the downlink communication failed to satisfy a threshold (e.g., that channel quality is poor). Here, the UE may determine that the UE is transmit a so-called soft NACK associated with the downlink communication, where the soft NACK is to indicate that the downlink was received but that the channel quality failed to satisfy a threshold.

As shown by reference 306, the UE may transmit, and the base station may receive, the NACK associated with the downlink communication. In some aspects, as described above, the NACK indicates that the downlink communication was not received by the UE. Alternatively, in some aspects, the NACK indicates that the downlink communication was received by the UE and that the channel quality associated with receiving the downlink communication failed to satisfy the threshold, as described above (i.e., the NACK may be a soft NACK).

As shown by reference 308, the base station may, based at least in part on receiving the NACK associated with the downlink communication, determine that the UE is to transmit a CSI report. For example, the base station may be configured with information indicating that a transmission of a NACK by the UE is to trigger the UE to transmit a CSI report and, therefore, the base station may determine that the UE is to transmit a CSI report based at least in part on receiving the NACK.

As shown by reference 310, the UE may transmit a CSI report based at least in part on transmitting the NACK associated with the downlink communication. Further, as shown by reference 312, the base station may monitor for the CSI report based at least in part on determining that the UE is to transmit the CSI report. That is, the base station may monitor for the CSI report based at least in part on receiving the NACK associated with the downlink communication.

In some aspects, the CSI report is a coverage enhanced CSI report. A coverage enhanced CSI report includes a CSI report that is generated and/or transmitted in a manner so as to improve coverage of the CSI report (e.g., to improve a likelihood that the base station will receive and successfully decode the CSI report). In some aspects, coverage enhancement can be provided through CSI report repetition, meaning that the CSI report is transmitted by the UE at least twice. Thus, in some aspects, transmitting the CSI report includes performing CSI report repetition.

In some aspects, the UE may transmit, and the base station may monitor for, the CSI report based at least in part on a CSI reporting configuration. In some aspects, the CSI reporting configuration is a configuration indicating one or more reporting parameters to be used by the UE when transmitting a NACK-triggered CSI report. In some aspects, the base station may provide, and the UE may receive, the CSI reporting configuration via radio resource control (RRC) signaling. Thus, in some aspects, the UE may transmit, and the base station may monitor for, the CSI report based at least in part on a reporting parameter. The reporting parameter may indicate, for example, a period of time during which the CSI report is to be transmitted (e.g., a period of time during which the UE is to transmit the CSI report to provide coverage enhancement), a number of CSI report repetitions associated with transmitting the CSI report (e.g., a number of times that the UE is to transmit the CSI report to provide coverage enhancement), a configured grant associated with the CSI report (e.g., a configured grant the resources of which are to be used for transmitting the CSI report), or the like.

In some aspects, the base station may transmit, and the UE may receive, information indicating a setting of the reporting parameter in the CSI reporting configuration. That is, in some aspects, a reporting parameter may be set as part of a CSI report setting configuration (e.g., for a periodic CSI report or a semi-persistent CSI report, as described above). Additionally, or alternatively, the base station may transmit, and the UE may receive, information indicating a setting of a reporting parameter in DCI (e.g., associated with triggering a semi-persistent CSI report). That is, in some aspects, a reporting parameter may be set by DCI (e.g., DCI that triggers a semi-persistent CSI report).

In some aspects, the UE may transmit the CSI report, and the base station may monitor for the CSI report, based at least in part on a configured grant associated with a PUSCH (e.g., a configured grant indicated in the CSI reporting configuration). For example, for coverage enhancement of a periodic CSI report or a semi-persistent CSI report transmitted on a PUSCH, repetition of the CSI report may be performed in resources of a configured grant (e.g., a configured grant previously configured for the UE). Thus, in some aspects, repetition of a CSI report on a configured grant may be triggered by a NACK.

In some aspects, the UE may transmit the NACK using a PUCCH format that improves reliability of receipt of the NACK by the base station, such as PUCCH format 0 or PUCCH format 1. Here, using such a PUCCH format improves a likelihood of the base station receiving the NACK and, therefore, improves a likelihood that the UE base station will monitor for an upcoming CSI report. In some aspects, the base station may determine the PUCCH format of the NACK based at least in part on performing blind format detection. That is, the UE may use a particular PUCCH format (e.g., PUCCH format 0, PUCCH format 1, or the like) to send the NACK so that the base station can reliably detect the NACK (e.g., by performing blind format detection to determine the PUCCH format) and prepare for monitoring for the CSI report, accordingly.

In this way, one or more parameters used by the UE for transmitting the CSI report, and used by the base station for monitoring for the CSI report, may be based at least in part on the transmission/reception of the NACK associated with the downlink communication. That is, one or more parameters for transmitting/monitoring for the CSI report may be identified, determined, or selected by the UE/base station as a result of the NACK triggering the CSI report. As described in the above examples, these one or more parameters may be associated with, for example, a type of the CSI report (e.g., coverage enhanced CSI report), a CSI reporting configuration for the CSI report, a setting of a reporting parameter for the CSI report, or a configured grant to be used for transmitting the CSI report, among other examples.

As indicated above, FIG. 3 is provided as an example. Other examples may differ from what is described with respect to FIG. 3.

Figure 4:
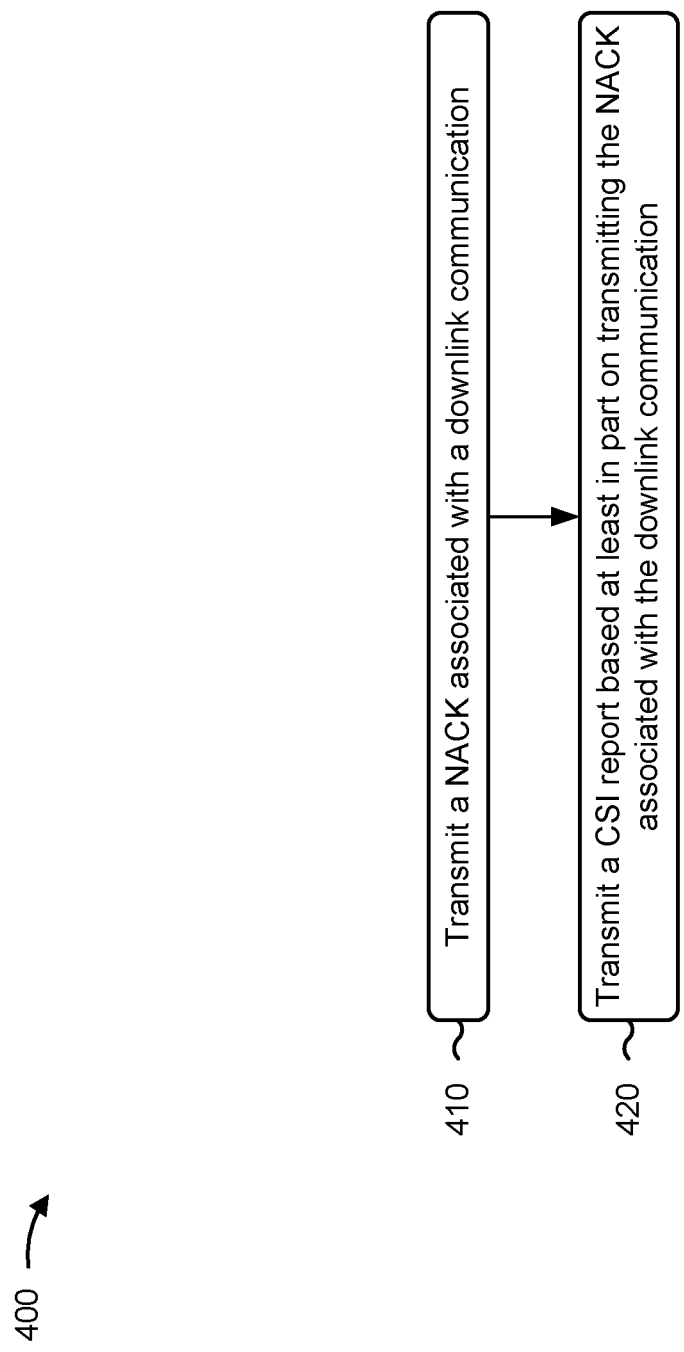
FIG. 4 is a diagram illustrating an example process performed, for example, by a user equipment, in accordance with the present disclosure.

FIG. 4 is a diagram illustrating an example process 400 performed, for example, by a UE, in accordance with the present disclosure. Example process 400 is an example where the UE (e.g., UE 120 and/or the like) performs operations associated with CSI report transmission triggered by a NACK.

As shown in FIG. 4, in some aspects, process 400 may include transmitting a NACK associated with a downlink communication (block 410). For example, the UE (e.g., using transmit processor 264, controller/processor 280, memory 282, and/or the like) may transmit a NACK associated with a downlink communication, as described above.

As further shown in FIG. 4, in some aspects, process 400 may include transmitting a CSI report based at least in part on transmitting the NACK associated with the downlink communication (block 420). For example, the UE (e.g., using transmit processor 264, controller/processor 280, memory 282, and/or the like) may transmit a CSI report based at least in part on transmitting the NACK associated with the downlink communication, as described above.

Process 400 may include additional aspects, such as any single aspect or any combination of aspects described below and/or in connection with one or more other processes described elsewhere herein.

In a first aspect, the CSI report is a coverage enhanced CSI report.

In a second aspect, alone or in combination with the first aspect, transmitting the CSI report includes performing CSI report repetition.

In a third aspect, alone or in combination with one or more of the first and second aspects, the NACK indicates that the downlink communication was not received by the UE.

In a fourth aspect, alone or in combination with one or more of the first through third aspects, the NACK indicates that the downlink communication was received by the UE and that a channel quality associated with receiving the downlink communication failed to satisfy a threshold.

In a fifth aspect, alone or in combination with one or more of the first through fourth aspects, the CSI report is transmitted based at least in part on a configured grant associated with a physical uplink shared channel.

In a sixth aspect, alone or in combination with one or more of the first through fifth aspects, information indicating a setting of a reporting parameter associated with the CSI report is received in a CSI reporting configuration.

In a seventh aspect, alone or in combination with one or more of the first through sixth aspects, information indicating a setting of a reporting parameter associated with the CSI report is received in downlink control information associated with triggering a semi-persistent CSI report.

In an eighth aspect, alone or in combination with one or more of the first through seventh aspects, the CSI report is transmitted based at least in part on a reporting parameter associated with at least one of a period of time during which the CSI report is to be transmitted, a number of CSI report repetitions associated with transmitting the CSI report, or a configured grant associated with the CSI report. In a ninth aspect, alone or in combination with one or more of the first through eighth aspects, the NACK is transmitted using PUCCH format 0 or PUCCH format 1.

In a tenth aspect, alone or in combination with one or more of the first through ninth aspects, the CSI report is transmitted based at least in part on a CSI reporting configuration.

In an eleventh aspect, alone or in combination with one or more of the first through tenth aspects, a CSI reporting configuration associated with the CSI report is received via radio resource control signaling.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
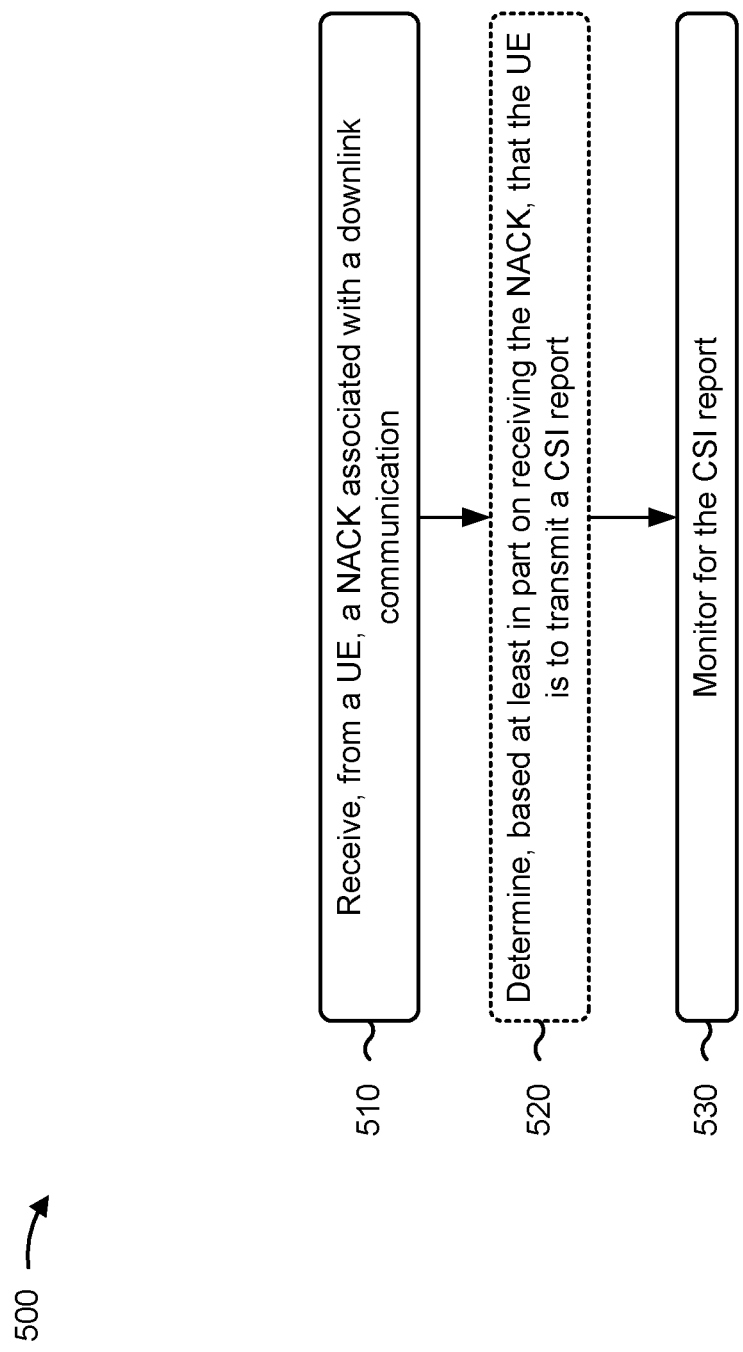
FIG. 5 is a diagram illustrating an example process performed, for example, by a base station, in accordance with the present disclosure.

FIG. 5 is a diagram illustrating an example process 500 performed, for example, by a base station, in accordance with the present disclosure. Example process 500 is an example where the base station (e.g., base station 110 and/or the like) performs operations associated with CSI report transmission triggered by a NACK.

As shown in FIG. 5, in some aspects, process 500 may include receiving, from a UE, a NACK associated with a downlink communication (block 510). For example, the base station (e.g., using receive processor 238, controller/processor 240, memory 242, and/or the like) may receive, from a UE (e.g., a UE 120), a NACK associated with a downlink communication, as described above.

As further shown in FIG. 5, in some aspects, process 500 may include determining, based at least in part on receiving the NACK, that the UE is to transmit a CSI report (block 520). For example, the base station (e.g., using receive processor 238, controller/processor 240, memory 242, and/or the like) may determine, based at least in part on receiving the NACK, that the UE is to transmit a CSI report, as described above.

As further shown in FIG. 5, in some aspects, process 500 may include monitoring for the CSI report (block 530). For example, the base station (e.g., using receive processor 238, controller/processor 240, memory 242, and/or the like) may monitor for the CSI report based at least in part on determining that the UE is to transmit the CSI report, as described above. Put another way, the base station (e.g., using receive processor 238, controller/processor 240, memory 242, and/or the like) may monitor for the CSI report based at least in part on receiving the NACK associated with the downlink communication, as described above.

Process 500 may include additional aspects, such as any single aspect or any combination of aspects described below and/or in connection with one or more other processes described elsewhere herein.

In a first aspect, the CSI report is a coverage enhanced CSI report.

In a second aspect, alone or in combination with the first aspect, the CSI report is to be transmitted using CSI report repetition.

In a third aspect, alone or in combination with one or more of the first and second aspects, the NACK indicates that the downlink communication was not received by the UE.

In a fourth aspect, alone or in combination with one or more of the first through third aspects, the NACK indicates that the downlink communication was received by the UE and that a channel quality associated with receiving the downlink communication failed to satisfy a threshold.

In a fifth aspect, alone or in combination with one or more of the first through fourth aspects, monitoring for the CSI report is performed based at least in part on a configured grant associated with a physical uplink shared channel.

In a sixth aspect, alone or in combination with one or more of the first through fifth aspects, information indicating a setting of a reporting parameter associated with the CSI report is transmitted in a CSI reporting configuration.

In a seventh aspect, alone or in combination with one or more of the first through sixth aspects, information indicating a setting of a reporting parameter associated with the CSI report is transmitted in downlink control information associated with triggering a semi-persistent CSI report.

In an eighth aspect, alone or in combination with one or more of the first through seventh aspects, monitoring for the CSI report is performed based at least in part on a reporting parameter indicating at least one of a period of time during which the CSI report is to be transmitted, a number of CSI report repetitions associated with transmitting the CSI report, or a configured grant associated with the CSI report.

In a ninth aspect, alone or in combination with one or more of the first through eighth aspects, the NACK uses PUCCH format 0 or PUCCH format 1.

In a tenth aspect, alone or in combination with one or more of the first through ninth aspects, a physical uplink control channel format of the NACK is determined based at least in part on performing blind format detection.

In an eleventh aspect, alone or in combination with one or more of the first through tenth aspects, a CSI reporting configuration associated with the CSI report is transmitted via radio resource control signaling.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
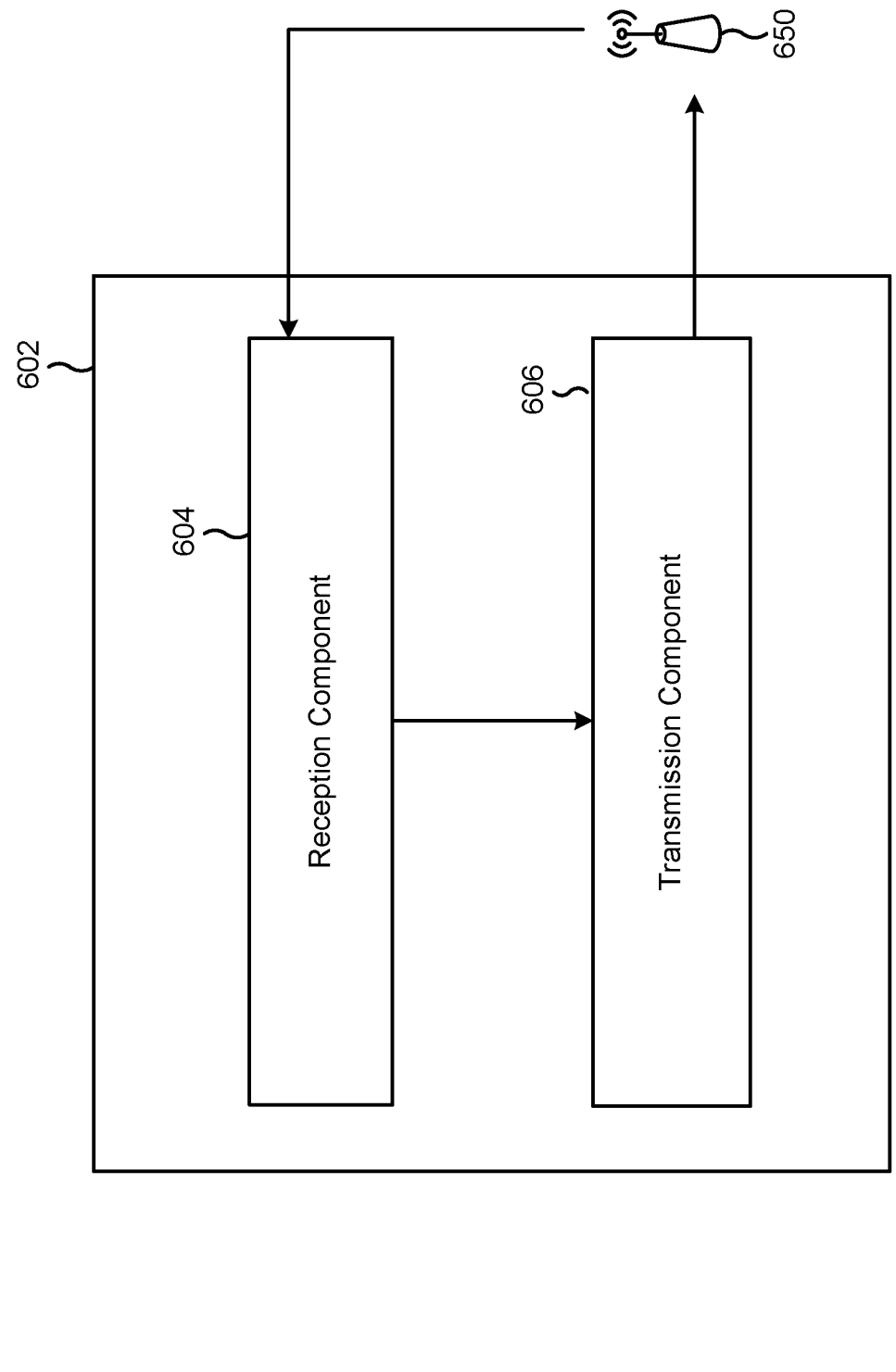
FIG. 6 is a data flow diagram illustrating a data flow between different components in an example apparatus, in accordance with the present disclosure.

FIG. 6 is a data flow diagram 600 illustrating a data flow between different components in an example apparatus 602. The apparatus 602 may be a UE (e.g., UE 120). In some aspects, the apparatus 602 includes a reception component 604 and/or a transmission component 606. As shown, the apparatus 602 may communicate with another apparatus 650 (such as a UE, a base station, or another wireless communication device) using the reception component 604 and the transmission component 606.

In some aspects, the transmission component 606 may transmit a NACK associated with a downlink communication, as described herein. In some aspects, the transmission component 606 may transmit a CSI report based at least in part on transmitting the NACK associated with the downlink communication, as described herein.

The apparatus may include additional components that perform each of the blocks of the algorithm in the aforementioned process 400 of FIG. 4 and/or the like. Each block in the aforementioned process 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
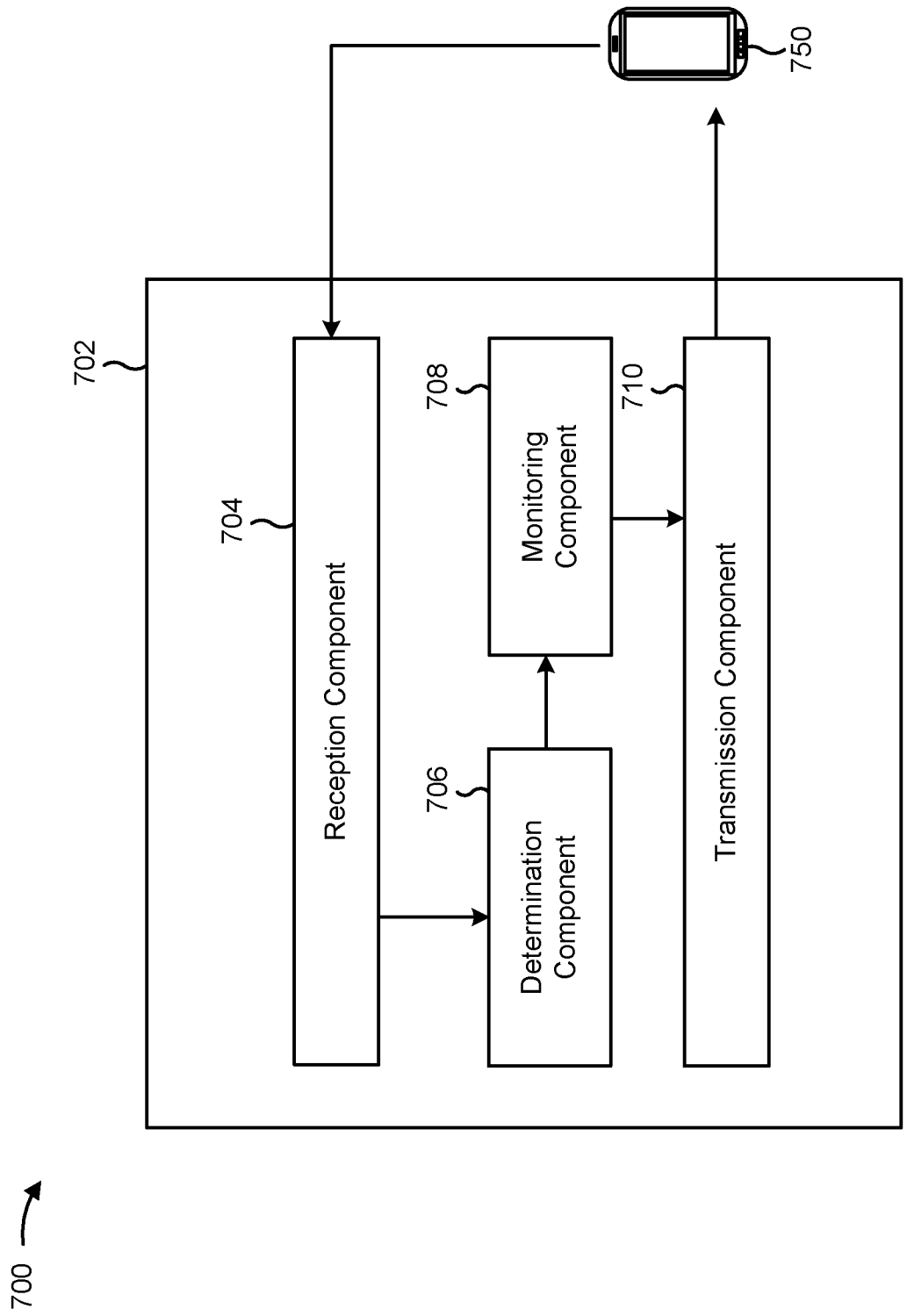
FIG. 7 is a data flow diagram illustrating a data flow between different components in an example apparatus, in accordance with the present disclosure.

FIG. 7 is a data flow diagram 700 illustrating a data flow between different components in an example apparatus 702. The apparatus 702 may be a base station (e.g., base station 110). In some aspects, the apparatus 702 includes a reception component 704, a determination component 706, a monitoring component 708, and/or a transmission component 710. As shown, the apparatus 702 may communicate with another apparatus 750 (such as a UE, a base station, or another wireless communication device) using the reception component 704 and the transmission component 710.

In some aspects, the reception component 704 may receive, from a UE (e.g., a UE 120, an apparatus 602), a NACK associated with a downlink communication, as described herein. In some aspects, the determination component 706 may determine, based at least in part on receiving the NACK, that the UE is to transmit a CSI report, as described herein. In some aspects, the monitoring component 708 may monitor for the CSI report based at least in part on determining that the UE is to transmit the CSI report, as described herein. That is, in some aspects, the monitoring component 708 may monitor for the CSI report based at least in part on receiving the NACK associated with the downlink communication, as described herein.

The apparatus may include additional components that perform each of the blocks of the algorithm in the aforementioned process 500 of FIG. 5 and/or the like. Each block in the aforementioned process 500 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: transmitting a negative acknowledgment (NACK) associated with a downlink communication; and transmitting a channel state information (CSI) report based at least in part on transmitting the NACK associated with the downlink communication.

Aspect 2: The method of Aspect 1, wherein the CSI report is a coverage enhanced CSI report.

Aspect 3: The method of any of Aspects 1-2, wherein transmitting the CSI report includes performing CSI report repetition.

Aspect 4: The method of any of Aspects 1-3, wherein the NACK indicates that the downlink communication was not received by the UE.

Aspect 5: The method of any of Aspects 1-3, wherein the NACK indicates that the downlink communication was received by the UE and that a channel quality associated with receiving the downlink communication failed to satisfy a threshold.

Aspect 6: The method of any of Aspects 1-5, wherein the CSI report is transmitted based at least in part on a configured grant associated with a physical uplink shared channel.

Aspect 7: The method of any of Aspects 1-6, wherein information indicating a setting of a reporting parameter associated with the CSI report is received in a CSI reporting configuration.

Aspect 8: The method of any of Aspects 1-7, wherein information indicating a setting of a reporting parameter associated with the CSI report is received in downlink control information associated with triggering a semi-persistent CSI report.

Aspect 9: The method of any of Aspects 1-8, wherein the CSI report is transmitted based at least in part on a reporting parameter associated with at least one of: a period of time during which the CSI report is to be transmitted, a number of CSI report repetitions associated with transmitting the CSI report, or a configured grant associated with the CSI report.

Aspect 10: The method of any of Aspects 1-9, wherein the NACK is transmitted using physical uplink control channel (PUCCH) format 0 or PUCCH format 1.

Aspect 11: The method of any of Aspects 1-10, wherein the CSI report is transmitted based at least in part on a CSI reporting configuration.

Aspect 12: The method of any of Aspects 1-11, wherein a CSI reporting configuration associated with the CSI report is received via radio resource control signaling.

Aspect 13: A method of wireless communication performed by a base station, comprising: receiving, from a user equipment (UE), a negative acknowledgment (NACK) associated with a downlink communication; determining, based at least in part on receiving the NACK, that the UE is to transmit a channel state information (CSI) report; and monitoring for the CSI report based at least in part on determining that the UE is to transmit the CSI report.

Aspect 14: The method of Aspect 13, wherein the CSI report is a coverage enhanced CSI report.

Aspect 15: The method of any of Aspects 13-14, wherein the CSI report is to be transmitted using CSI report repetition.

Aspect 16: The method of any of Aspects 13-15, wherein the NACK indicates that the downlink communication was not received by the UE.

Aspect 17: The method of any of Aspects 13-15, wherein the NACK indicates that the downlink communication was received by the UE and that a channel quality associated with receiving the downlink communication failed to satisfy a threshold.

Aspect 18: The method of any of Aspects 13-17, wherein monitoring for the CSI report is performed based at least in part on a configured grant associated with a physical uplink shared channel.

Aspect 19: The method of any of Aspects 13-18, wherein information indicating a setting of a reporting parameter associated with the CSI report is transmitted in a CSI reporting configuration.

Aspect 20: The method of any of Aspects 13-19, wherein information indicating a setting of a reporting parameter associated with the CSI report is transmitted in downlink control information associated with triggering a semi-persistent CSI report.

Aspect 21: The method of any of Aspects 13-20, wherein monitoring for the CSI report is performed based at least in part on a reporting parameter indicating at least one of: a period of time during which the CSI report is to be transmitted, a number of CSI report repetitions associated with transmitting the CSI report, or a configured grant associated with the CSI report.

Aspect 22: The method of any of Aspects 13-21, wherein the NACK uses physical uplink control channel (PUCCH) format 0 or PUCCH format 1.

Aspect 23: The method of any of Aspects 13-22, wherein a physical uplink control channel format of the NACK is determined based at least in part on performing blind format detection.

Aspect 24: The method of any of Aspects 13-23, wherein a CSI reporting configuration associated with the CSI report is transmitted via radio resource control signaling.

Aspect 25: A method of wireless communication performed by a base station, comprising: receiving, from a user equipment (UE), a negative acknowledgment (NACK) associated with a downlink communication; monitoring for a channel state information (CSI) report based at least in part on receiving the NACK associated with the downlink communication.

Aspect 26: The method of Aspect 25, wherein the CSI report is a coverage enhanced CSI report.

Aspect 27: The method of any of Aspects 25-26, wherein the CSI report is to be transmitted using CSI report repetition.

Aspect 28: The method of any of Aspects 25-27, wherein the NACK indicates that the downlink communication was not received by the UE.

Aspect 29: The method of any of Aspects 25-27, wherein the NACK indicates that the downlink communication was received by the UE and that a channel quality associated with receiving the downlink communication failed to satisfy a threshold.

Aspect 30: The method of any of Aspects 25-29, wherein monitoring for the CSI report is performed based at least in part on a configured grant associated with a physical uplink shared channel.

Aspect 31: The method of any of Aspects 25-30, wherein information indicating a setting of a reporting parameter associated with the CSI report is transmitted in a CSI reporting configuration.

Aspect 32: The method of any of Aspects 25-31, wherein information indicating a setting of a reporting parameter associated with the CSI report is transmitted in downlink control information associated with triggering a semi-persistent CSI report.

Aspect 33: The method of any of Aspects 25-32, wherein monitoring for the CSI report is performed based at least in part on a reporting parameter indicating at least one of: a period of time during which the CSI report is to be transmitted, a number of CSI report repetitions associated with transmitting the CSI report, or a configured grant associated with the CSI report.

Aspect 34: The method of any of Aspects 25-33, wherein the NACK uses physical uplink control channel (PUCCH) format 0 or PUCCH format 1.

Aspect 35: The method of any of Aspects 25-34, wherein a physical uplink control channel format of the NACK is determined based at least in part on performing blind format detection.

Aspect 36: The method of any of Aspects 25-35, wherein a CSI reporting configuration associated with the CSI report is transmitted via radio resource control signaling.

Aspect 37: An apparatus for wireless communication at a device, comprising a processor; memory coupled with the processor; and instructions stored in the memory and executable by the processor to cause the apparatus to perform the method of one or more Aspects of Aspects 1-12.

Aspect 38: A device for wireless communication, comprising a memory and one or more processors coupled to the memory, the memory and the one or more processors configured to perform the method of one or more Aspects of Aspects 1-12.

Aspect 39: An apparatus for wireless communication, comprising at least one means for performing the method of one or more Aspects of Aspects 1-12.

Aspect 40: A non-transitory computer-readable medium storing code for wireless communication, the code comprising instructions executable by a processor to perform the method of one or more Aspects of Aspects 1-12.

Aspect 41: A non-transitory computer-readable medium storing a set of instructions for wireless communication, the set of instructions comprising one or more instructions that, when executed by one or more processors of a device, cause the device to perform the method of one or more Aspects of Aspects 1-12.

Aspect 42: An apparatus for wireless communication at a device, comprising a processor; memory coupled with the processor; and instructions stored in the memory and executable by the processor to cause the apparatus to perform the method of one or more Aspects of Aspects 13-24.

Aspect 43: A device for wireless communication, comprising a memory and one or more processors coupled to the memory, the memory and the one or more processors configured to perform the method of one or more Aspects of Aspects 13-24.

Aspect 44: An apparatus for wireless communication, comprising at least one means for performing the method of one or more Aspects of Aspects 13-24.

Aspect 45: A non-transitory computer-readable medium storing code for wireless communication, the code comprising instructions executable by a processor to perform the method of one or more Aspects of Aspects 13-24.

Aspect 46: A non-transitory computer-readable medium storing a set of instructions for wireless communication, the set of instructions comprising one or more instructions that, when executed by one or more processors of a device, cause the device to perform the method of one or more Aspects of Aspects 13-24.

Aspect 47: An apparatus for wireless communication at a device, comprising a processor; memory coupled with the processor; and instructions stored in the memory and executable by the processor to cause the apparatus to perform the method of one or more Aspects of Aspects 25-36.

Aspect 48: A device for wireless communication, comprising a memory and one or more processors coupled to the memory, the memory and the one or more processors configured to perform the method of one or more Aspects of Aspects 25-36.

Aspect 49: An apparatus for wireless communication, comprising at least one means for performing the method of one or more Aspects of Aspects 25-36.

Aspect 50: A non-transitory computer-readable medium storing code for wireless communication, the code comprising instructions executable by a processor to perform the method of one or more Aspects of Aspects 25-36.

Aspect 51: A non-transitory computer-readable medium storing a set of instructions for wireless communication, the set of instructions comprising one or more instructions that, when executed by one or more processors of a device, cause the device to perform the method of one or more Aspects of Aspects 25-36.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting a negative acknowledgment (NACK) associated with a downlink communication; and
    transmitting a channel state information (CSI) report based at least in part on transmitting the NACK associated with the downlink communication,
        wherein transmission of the NACK triggers CSI report repetition, and
        wherein the CSI report repetition comprises transmitting the CSI report multiple times.

2. The method of claim 1, wherein the CSI report is a coverage enhanced CSI report.

3. The method of claim 1, wherein the NACK indicates that the downlink communication was not received by the UE.

4. The method of claim 1, wherein the NACK indicates that the downlink communication was received by the UE and that a channel quality associated with receiving the downlink communication failed to satisfy a threshold.

5. The method of claim 1, wherein the CSI report is transmitted based at least in part on a configured grant associated with a physical uplink shared channel.

6. The method of claim 1, wherein information indicating a setting of a reporting parameter associated with the CSI report is received in a CSI reporting configuration.

7. The method of claim 1, wherein information indicating a setting of a reporting parameter associated with the CSI report is received in downlink control information associated with triggering a semi-persistent CSI report.

8. The method of claim 1, wherein the CSI report is transmitted based at least in part on a reporting parameter associated with at least one of:
    a period of time during which the CSI report is to be transmitted,
    a number of CSI report repetitions associated with transmitting the CSI report, or
    a configured grant associated with the CSI report.

9. The method of claim 1, wherein the NACK is transmitted using physical uplink control channel (PUCCH) format 0 or PUCCH format 1.

10. The method of claim 1, wherein the CSI report is transmitted based at least in part on a CSI reporting configuration.

11. The method of claim 1, wherein a CSI reporting configuration associated with the CSI report is received via radio resource control signaling.

12. A method of wireless communication performed by a base station, comprising:
    receiving, from a user equipment (UE), a negative acknowledgment (NACK) associated with a downlink communication; and
    monitoring for a channel state information (CSI) report based at least in part on receiving the NACK associated with the downlink communication,
        wherein transmission of the NACK triggers CSI report repetition, and
        wherein the CSI report repetition comprises transmitting the CSI report multiple times.

13. The method of claim 12, wherein the CSI report is a coverage enhanced CSI report.

14. The method of claim 12, wherein the NACK indicates that the downlink communication was not received by the UE.

15. The method of claim 12, wherein the NACK indicates that the downlink communication was received by the UE and that a channel quality associated with receiving the downlink communication failed to satisfy a threshold.

16. The method of claim 12, wherein monitoring for the CSI report is performed based at least in part on a configured grant associated with a physical uplink shared channel.

17. The method of claim 12, wherein information indicating a setting of a reporting parameter associated with the CSI report is transmitted in a CSI reporting configuration.

18. The method of claim 12, wherein information indicating a setting of a reporting parameter associated with the CSI report is transmitted in downlink control information associated with triggering a semi-persistent CSI report.

19. The method of claim 12, wherein monitoring for the CSI report is performed based at least in part on a reporting parameter indicating at least one of:
   a period of time during which the CSI report is to be transmitted,
   a number of CSI report repetitions associated with transmitting the CSI report, or
   a configured grant associated with the CSI report.

20. The method of claim 12, wherein the NACK uses physical uplink control channel (PUCCH) format 0 or PUCCH format 1.

21. The method of claim 12, wherein a physical uplink control channel format of the NACK is determined based at least in part on performing blind format detection.

22. The method of claim 12, wherein a CSI reporting configuration associated with the CSI report is transmitted via radio resource control signaling.

23. A user equipment (UE) for wireless communication, comprising:
   a memory; and
   one or more processors coupled to the memory, the one or more processors configured to:
      transmit a negative acknowledgment (NACK) associated with a downlink communication; and
      transmit a channel state information (CSI) report based at least in part on transmitting the NACK associated with the downlink communication,
      wherein transmission of the NACK triggers CSI report repetition, and
      wherein the CSI report repetition comprises transmitting the CSI report multiple time.

24. The UE of claim 23, wherein the CSI report is a coverage enhanced CSI report.

25. A base station for wireless communication, comprising:
   a memory; and
   one or more processors coupled to the memory, the one or more processors configured to:
      receive, from a user equipment (UE), a negative acknowledgment (NACK) associated with a downlink communication; and
      monitor for a channel state information (CSI) report based at least in part on receiving the NACK associated with the downlink communication,
      wherein transmission of the NACK triggers CSI report repetition, and
      wherein the CSI report repetition comprises transmitting the CSI report multiple times.

26. The base station of claim 25, wherein the CSI report is a coverage enhanced CSI report.

* * * * *